United States Patent
Stitelman et al.

(10) Patent No.: US 9,306,958 B2
(45) Date of Patent: *Apr. 5, 2016

(54) METHODS, SYSTEMS AND MEDIA FOR DETECTING NON-INTENDED TRAFFIC USING CO-VISITATION INFORMATION

(71) Applicant: Dstillery, Inc., New York, NY (US)

(72) Inventors: Ori M. Stitelman, Livingston, NJ (US); Claudia Reisz, Mount Kisco, NY (US); Rodney Hook, New York, NY (US); Brian Dalessandro, Brooklyn, NY (US)

(73) Assignee: Dstillery, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,163

(22) Filed: May 6, 2014

(65) Prior Publication Data

US 2014/0351931 A1 Nov. 27, 2014

Related U.S. Application Data

(63) Continuation of application No. 13/906,006, filed on May 30, 2013, now Pat. No. 8,719,934.

(60) Provisional application No. 61/697,482, filed on Sep. 6, 2012.

(51) Int. Cl.
*H04L 29/06* (2006.01)

(52) U.S. Cl.
CPC ............ *H04L 63/1408* (2013.01); *H04L 63/10* (2013.01); *H04L 63/14* (2013.01); *H04L 63/1425* (2013.01); *H04L 63/168* (2013.01)

(58) Field of Classification Search
CPC ... H04L 63/10; H04L 63/1408; H04L 63/168; H04L 63/1425; H04L 63/14

USPC .......................................... 726/22, 23, 24, 25
See application file for complete search history.

(56) References Cited

U.S. PATENT DOCUMENTS

| 5,960,429 A | * | 9/1999 | Peercy ............... G06F 17/30864 707/752 |
| 6,633,835 B1 | * | 10/2003 | Moran ..................... H04L 47/10 702/181 |

(Continued)

OTHER PUBLICATIONS

Nesserine Benchettara et al. "Supervised Machine Learning applied to Link Prediction in Bipartite Social Networks" 2010 International Conference on Advances in Social Networks Analysis and Mining, IEEE Computer Society, 978-0-7695-4138-9/10, 2010 IEEE, pp. 326-330.

(Continued)

*Primary Examiner* — David García Cervetti
(74) *Attorney, Agent, or Firm* — Cooley LLP

(57) ABSTRACT

A non-transitory processor-readable medium is provided that stores code representing instructions to be executed by a processor to receive data associated with access by a first plurality of entities to a first website location and to receive data associated with access by a second plurality of entities to a second website location. The processor is also caused to define a co-visitation factor for each of the first website location and the second website location based on the received data. The processor is also caused to, if the co-visitation factor of the first website location and/or the co-visitation factor of the second website location is over a predefined threshold, select the first website location and/or the second website location as target website locations. The processor is caused to send a signal to set a flag associated with each target website location indicating the target website location as a suspicious website location.

22 Claims, 6 Drawing Sheets

(56) References Cited

U.S. PATENT DOCUMENTS

| | | | | |
|---|---|---|---|---|
| 7,039,699 B1* | 5/2006 | Narin | G06Q 30/02 709/207 |
| 7,051,074 B1* | 5/2006 | Buchsbaum | G06Q 30/0241 707/999.104 |
| 7,343,626 B1* | 3/2008 | Gallagher | G06F 21/577 707/999.003 |
| 7,558,805 B2* | 7/2009 | Goel | G06F 17/30864 |
| 7,584,287 B2* | 9/2009 | Schneider | G06Q 30/02 709/224 |
| 7,610,276 B2* | 10/2009 | Yomtobian | G06Q 30/02 |
| 7,624,447 B1* | 11/2009 | Horowitz | H04L 63/0263 726/23 |
| 7,657,626 B1* | 2/2010 | Zwicky | G06Q 30/02 705/51 |
| 7,809,801 B1* | 10/2010 | Wang | G06F 15/16 709/217 |
| 7,917,491 B1* | 3/2011 | Sack | G06Q 30/02 707/708 |
| 7,953,667 B1* | 5/2011 | Zuili | G06Q 30/0248 705/52 |
| 8,103,543 B1* | 1/2012 | Zwicky | G06Q 30/02 705/14.26 |
| 8,117,659 B2* | 2/2012 | Hartrell | G06F 21/552 709/223 |
| 8,135,615 B2* | 3/2012 | Bradley | G06Q 30/0185 705/14.47 |
| 8,141,148 B2* | 3/2012 | Thomas | H04L 63/1408 709/223 |
| 8,205,258 B1* | 6/2012 | Chang | G06F 17/30684 709/217 |
| 8,209,406 B2* | 6/2012 | Malhotra | G06Q 20/20 370/229 |
| 8,370,365 B1* | 2/2013 | Christian | G06F 17/30864 707/723 |
| 8,442,984 B1* | 5/2013 | Pennock | G06Q 10/0639 707/748 |
| 8,566,932 B1* | 10/2013 | Hotta | G06F 11/00 726/2 |
| 8,635,216 B1* | 1/2014 | Hepworth | G06F 17/30867 706/12 |
| 8,639,813 B2* | 1/2014 | Suganthi | H04L 63/0272 709/225 |
| 8,850,570 B1* | 9/2014 | Ramzan | G06F 1/00 709/223 |
| 8,874,570 B1* | 10/2014 | Macduff | G06F 17/30864 707/723 |
| 8,918,903 B1* | 12/2014 | Schepis | H04L 67/22 709/224 |
| 8,935,284 B1* | 1/2015 | Cooley | G06F 17/30867 707/776 |
| 2002/0021665 A1* | 2/2002 | Bhagavath | H04L 12/2602 370/229 |
| 2003/0145233 A1* | 7/2003 | Poletto | H04L 63/1408 726/22 |
| 2004/0083474 A1* | 4/2004 | McKinlay | G06F 8/61 717/176 |
| 2004/0128157 A1* | 7/2004 | Aquilino | G06Q 30/02 463/25 |
| 2004/0153365 A1* | 8/2004 | Schneider | G06Q 30/02 705/14.19 |
| 2004/0205419 A1* | 10/2004 | Liang | G06F 21/552 714/57 |
| 2005/0154716 A1* | 7/2005 | Watson | G06F 17/30648 |
| 2005/0154718 A1* | 7/2005 | Payne | G06F 7/00 |
| 2006/0059225 A1* | 3/2006 | Stonehocker | G06F 17/30884 709/202 |
| 2006/0075084 A1* | 4/2006 | Lyon | H04L 29/06027 709/223 |
| 2006/0253425 A1* | 11/2006 | Borgs | G06Q 30/02 |
| 2007/0124801 A1* | 5/2007 | Thomas | H04L 63/1408 726/3 |
| 2007/0150957 A1* | 6/2007 | Hartrell | G06F 21/552 726/24 |
| 2007/0255821 A1* | 11/2007 | Ge | G06Q 10/00 709/224 |
| 2007/0276790 A1* | 11/2007 | Walsh | G06F 17/30861 |
| 2008/0027920 A1* | 1/2008 | Schipunov | G06F 17/30545 |
| 2008/0027924 A1* | 1/2008 | Hamilton | G06F 17/30867 |
| 2008/0028066 A1* | 1/2008 | Berkhin | G06F 17/30702 709/224 |
| 2008/0028067 A1* | 1/2008 | Berkhin | G06F 17/30702 709/224 |
| 2008/0031447 A1* | 2/2008 | Geshwind | H04L 9/0822 380/46 |
| 2008/0071903 A1* | 3/2008 | Schuba | H04L 43/18 709/224 |
| 2008/0071904 A1* | 3/2008 | Schuba | H04L 43/18 709/224 |
| 2008/0077561 A1* | 3/2008 | Yomtobian | G06Q 30/02 |
| 2008/0082655 A1* | 4/2008 | Goswami | G06Q 10/06 709/224 |
| 2008/0086434 A1* | 4/2008 | Chesla | G06N 5/048 706/12 |
| 2008/0091524 A1* | 4/2008 | Yan | G06Q 30/02 705/14.45 |
| 2008/0127306 A1* | 5/2008 | Blumfield | H04L 63/1441 726/3 |
| 2008/0127338 A1* | 5/2008 | Cho | G06F 21/566 726/22 |
| 2008/0147848 A1* | 6/2008 | Zadikario | G06Q 30/0246 709/224 |
| 2008/0228580 A1* | 9/2008 | Korman | G06Q 30/0226 705/14.27 |
| 2008/0270154 A1* | 10/2008 | Klots | G06Q 30/02 705/14.4 |
| 2008/0300976 A1* | 12/2008 | Raghunandan | G06Q 30/02 705/14.66 |
| 2009/0055369 A1* | 2/2009 | Phillips | G06F 17/30867 |
| 2009/0157417 A1* | 6/2009 | Bradley | G06Q 30/0185 705/318 |
| 2009/0234887 A1* | 9/2009 | Rosenfield | G06F 17/3089 |
| 2009/0282476 A1* | 11/2009 | Nachenberg | G06F 21/50 726/22 |
| 2009/0328209 A1* | 12/2009 | Nachenberg | G06F 21/62 726/22 |
| 2010/0131441 A1* | 5/2010 | Gruenhagen | G06F 17/30867 706/45 |
| 2010/0228852 A1* | 9/2010 | Gemelos | G06Q 30/02 709/224 |
| 2010/0281536 A1* | 11/2010 | Richards | G06F 21/552 726/22 |
| 2010/0332508 A1* | 12/2010 | Gustafson | G06Q 30/02 707/759 |
| 2011/0022582 A1* | 1/2011 | Unnikrishnan | G06F 17/30864 707/715 |
| 2011/0055008 A1* | 3/2011 | Feuerstein | G06Q 30/02 705/14.51 |
| 2011/0185423 A1* | 7/2011 | Sallam | G06F 21/566 726/23 |
| 2011/0258039 A1* | 10/2011 | Patwa | G06Q 30/00 705/14.45 |
| 2011/0288911 A1* | 11/2011 | Barnes, Jr. | G06F 3/04847 705/14.1 |
| 2012/0036580 A1* | 2/2012 | Gorny et al. | H04L 63/1433 726/25 |
| 2012/0084146 A1* | 4/2012 | Zwicky | G06Q 30/02 705/14.47 |
| 2012/0137367 A1* | 5/2012 | Dupont | G06F 21/00 726/25 |
| 2012/0144490 A1* | 6/2012 | Hartrell | G06F 21/552 726/24 |
| 2013/0185802 A1* | 7/2013 | Tibeica | H04L 63/1483 726/26 |
| 2013/0282690 A1* | 10/2013 | Stouffer | G06F 17/30864 707/709 |
| 2013/0282691 A1* | 10/2013 | Stouffer | G06F 17/30864 707/710 |
| 2014/0007238 A1* | 1/2014 | Magee | G06F 21/577 726/24 |

OTHER PUBLICATIONS

Behind-the-enemy-lines.com, May 16, 2011 "A Computer Scientist in a Business School" [online], [retrieved on May 30, 2013]

(56) References Cited

OTHER PUBLICATIONS

Retrieved from the internet: <URL: http://www.behind-the-enemy-lines.com/2011/03/uncovering-advertising-fraud-scheme.html,> 12 pages.

Benedelman.org, May 7, 2007, "How Spyware-Driven Forced Visits Inflate Web Site Counts" [online], [retrieved on May 30, 2013], Retrieved from the internet: <URL: http://www.bendelman.org/news/050707-1.html,> 7 pages.

* cited by examiner

METHODS, SYSTEMS AND MEDIA FOR DETECTING NON-INTENDED TRAFFIC USING CO-VISITATION INFORMATION

CROSS-REFERENCE TO RELATED APPLICATIONS

This application is a continuation of U.S. patent application Ser. No. 13/906,006, filed May 30, 2013, entitled "Methods, Systems And Media For Detecting Non-Intended Traffic Using Co-Visitation Information," now U.S. Pat. No. 8,719, 934, issued May 6, 2015. U.S. patent application Ser. No. 13/906,006, now U.S. Pat. No. 8,719,934, claims priority to U.S. Provisional Patent Application No. 61/697,482, entitled "Methods, Systems and Media for Detecting Non-Intended Traffic Using Co-Visitation Networks,"filed on Sep. 6, 2012. U.S. patent application Ser. No. 13/906 006, now U.S. Pat. No. 8,719,934, and U.S. Provisional Patent Application No. 61/697,482 are both incorporated herein by reference in their entirety.

BACKGROUND

Some embodiments described herein relate generally to detecting non-intended network traffic using network visitation information.

Network service providers such as, for example, advertisers or online markets use streams of network data to understand user behavior, relying on the fact that the observed actions represent the intentions of real network users. The service providers typically reply on understanding users' intentions to determine when and to whom to provide a service (e.g., an advertisement). Some service providers, however, use approaches for inflating traffic that does not coincide with real users' intentions, for example, by automatically redirecting a user to a network location after the user selects a different network location (e.g., a website), or by loading a website in the background while the user is viewing other content. This can artificially increase the amount of traffic for certain network locations by increasing the number of non-intended visits by users, thereby allowing these network locations to charge more for certain services such as advertisements.

Known methods have been developed to explicitly observe mechanisms that produce non-intended user visits to network locations and identify network locations with non-intended traffic. These known methods, however, are inadequate because the mechanisms that a network location uses for producing non-intended traffic have to be individually identified for each network location.

Therefore, a need exists to overcome the shortcomings of the known methods by detecting non-intended traffic using co-visitation information.

SUMMARY

In some embodiments, a non-transitory processor-readable medium stores code representing instructions to be executed by a processor, the code comprising code to cause the processor to receive a first data associated with access by a first set of entities to a first website location. The processor is also caused to receive a second data associated with access by a second set of entities to a second website location. The processor is also caused to define a co-visitation factor for each of the first website location and the second website location based on the first data and the second data. The processor is also caused to, if the co-visitation factor of the first website location and/or the co-visitation factor of the second website location is over a predefined threshold, select the first website location and/or the second website location as target website location(s). The processor is also caused to send a signal to set a flag associated with each target website location indicating the target website location as a suspicious website location.

DETAILED DESCRIPTION

Figure 1:
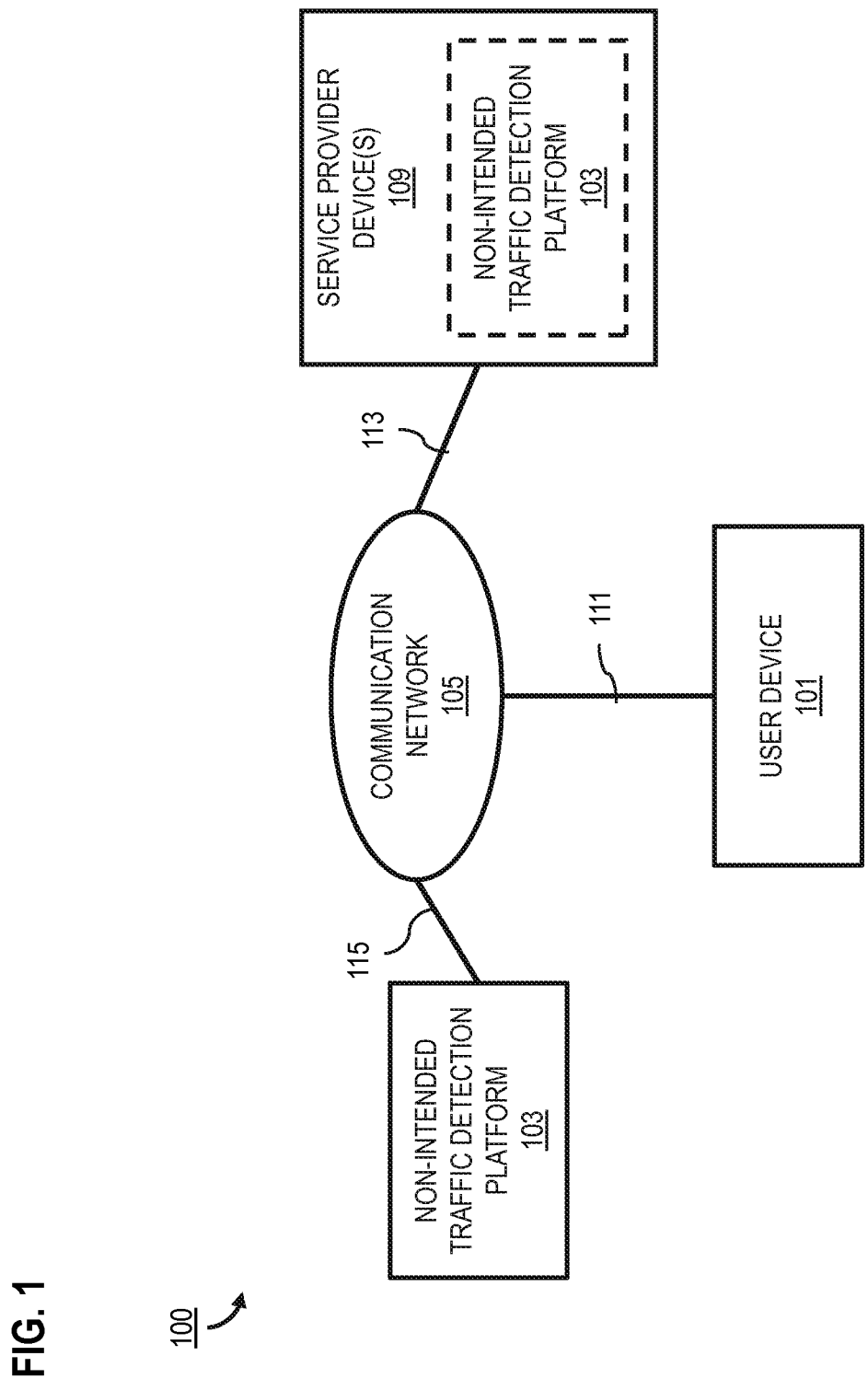
FIG. 1 is a schematic block diagram of a computer system in which detecting non-intended traffic using co-visitation information can be performed, according to an embodiment.

Known network traffic analysis systems observe various actions over networks, collect data associated with those actions, analyze the collected data, and provide analysis results to a variety of applications such as, for example, bid request analysis and selection from online real-time bidding auctions, display advertising, etc. Some service providers, however, direct unaware network users from network location to network location to monetize those network locations by increasing their traffic.

Various network services such as, for example, targeted advertising rely on understanding network users' intentions and using those intentions to decide on presenting advertisements to the users. Countless methods exist, however that network service providers can use to direct users to their network locations even if not intended by the user. Some of these methods guide a user to a non-intended network location while the user is visiting an intended network location. For example, when a user searches for "tap shoes" on a search engine, the method redirects the user to a website that sells tap shoes rather than just provide the search results. Meanwhile, other methods for directing users to non-intended network locations may be the result of artificial technical mechanisms and can even happen without the users' knowledge. For example, a user may be automatically redirected to a website after closing another website. For another example, a website can load in the background while the user is viewing other content. For the purpose of display advertising, distinguishing between the intended and the non-intended traffic is desirable because targeted advertising often relies on modeling the users' future intentions based on their past (intentional) actions.

Known methods have been developed to explicitly observe mechanisms that produce non-intended user visits to network locations and identify network locations with non-intended traffic. These known methods, however, are inadequate because the mechanisms that a network location uses for producing non-intended traffic typically have to be individually identified for each network location.

Methods and apparatus are described herein to identify website locations with a relatively large number of non-intended users irrespective of the source of the non-intended users. In some embodiments, a non-transitory processor-readable medium stores code representing instructions to be executed by a processor, the code comprising code to cause the processor to receive a first data associated with access by a first set of entities to a first website location. The processor is also caused to receive a second data associated with access by a second set of entities to a second website location. The processor is also caused to define a co-visitation factor for each of the first website location and the second website location based on the first data and the second data. The processor is also caused to select, if the co-visitation factor of the first website location and/or the co-visitation factor of the second website location is over a predefined threshold, the first website location and/or the second website location as target website location(s). The processor is also caused to send a signal to set a flag associated with each target website location indicating the target website location as a suspicious website location.

In some embodiments, an apparatus includes a calculation module implemented in at least one of a memory or a processing device. The calculation module is configured to, for each website location from a set of website locations, receive data representing a percentage of entities from a set of entities that accessed that website location based, at least in part, on the data. The calculation module is also configured to, for each website location from the set of website locations, define a normalization of the percentage based, at least in part, on a number of entities in the set of entities. The calculation module is further configured to, for each two website locations from the set of website locations, define a co-visitation factor based, at least in part, on the normalization of the percentage of entities. The apparatus also includes a detection module implemented in at least one of a memory or a processing device. The detection module is configured to receive data associated with access by the set of entities to the set of website locations. The detection module is also configured to receive the co-visitation factor for each website location from the set of website locations from the calculation module. The detection module is further configured to select at least one target website location from the set of website locations based, at least in part, on the co-visitation factor of the at least one website location. The apparatus further includes a decision module implemented in at least one of a memory or a processing device. The decision module is configured to send a signal to set a flag associated with the at least one target website location from the set of website locations indicating the at least one target website location as a suspicious website location.

In some embodiments, a non-transitory processor-readable medium stores code representing instructions to be executed by a processor, the code comprising code to cause the processor to receive data associated with access by a set of entities to a first set of website locations, in response to a request for a co-visitation factor for each website location from the first set of website locations. The processor is also caused to define a co-visitation factor for each website location from the first set of website locations based, at least in part, on the data. The processor is further caused to select a second set of website locations from the first set of website locations as target website locations, if the co-visitation factor of the second set of website locations is over a predefined threshold. The processor is also caused to identify a third set of website locations from the second set of website locations, if every website location from the third set of website locations is associated with a publisher from a set of publishers. The processor is further caused to send a signal to set a flag associated with the publisher indicating the publisher as a suspicious publisher.

As used herein, "user" can be a person, a module, a device, an application, or any entity that accesses a network location. In some of the embodiments discussed, a user is referred to as a person using a user device via one or more user interfaces. Additionally/alternatively, a user can be a device, a module of a device, or an application such as, for example, a bidding application, an advertisement engine, etc., that can cause network traffic that can be managed by the described methods and apparatus.

As used herein, the singular forms "a," "an" and "the" include plural referents unless the context clearly dictates otherwise. Thus, for example, the term "an "entity" is intended to mean a single entity or multiple entities (e.g., entities with similar access history or similar models of behavior, etc.).

FIG. 1 is a schematic block diagram of a computer system in which detecting non-intended traffic can be performed, according to an embodiment. The computer network system 100 includes at least one user device 101, a non-intended traffic detection platform 103, a communication network 105, and at least one service provider device(s) 109, which can be operatively coupled to one or more user device 101 or other service provider device(s) 109 via the communication network 105. Note that the non-intended traffic detection platform 103 or some of its components can be embedded within the service provider device(s) 109, or be external to the service provider device(s) 109, and operatively coupled to one or more user device 101 or one or more service provider device(s) 109 via the communication network 105. Any of the devices or platforms of the computer network system 100 can be equipped with local memory/storage spaces (not shown in FIG. 1). Furthermore, the devices and platforms of the computer network system 100 can have access to centralized or distributed memory/storage spaces (not shown in FIG. 1) for example through the communication network 105. Additionally, a user device 101, a non-intended traffic detection platform 103, and a service provider device(s) 109 each can include one or more processors, performing processes associated with the services provided to the user device 101 (each not shown in FIG. 1). Thus, FIG. 1 is merely an example illustrating the types of devices and platforms that can be included within a computer network system 100.

Communication network 105 can for example be any communication network, such as the Internet, configurable to allow the user device 101, the non-intended traffic detection platform 103, and the service provider device(s) 109 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the user device 101 can be operatively coupled to a cellular network; the service provider device(s) 109 and/or the non-intended traffic detection platform 103 can be operatively coupled to a fiber-optic network. The cellular network and fiber-optic network can each be operatively coupled to one another via one or more network bridges, routers, switches, and/or gateways such that the cellular network and the fiber-optic network are operatively coupled to collectively form a communication network. Alternatively, the cellular network and the fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the user device 101 is operatively coupled to communication network 105 via network connection(s) 111; service provider device(s) 109 is operatively coupled to communication network 105 via network connection(s) 113; and the non-intended traffic detection platform 103 is operatively coupled to communication network 105 via network connection(s) 115. Network connections 111, 113, and 115 can be any appropriate network connection for operatively coupling user device 101, service provider device(s) 109, and the non-intended traffic detection platform 103.

A network connection 111, 113, and 115 each can be a wireless network connection such as, for example, a wireless fidelity ("Wi-Fi") or wireless local area network ("WLAN") connection, a wireless wide area network ("WWAN") connection, and/or a cellular connection. A network connection 111, 113, and 115 each can be a wired connection such as, for example, an Ethernet connection, a digital subscription line ("DSL") connection, a broadband coaxial connection, and/or a fiber-optic connection.

As mentioned above, in some instances, a computer network system 100 can include more than one user device 101, more than one non-intended traffic detection platform 103, and more than one service provider device(s) 109. A user device 101, a non-intended traffic detection platform 103, and/or a service provider device(s) 109, can be operatively coupled to the communication network 105 by heterogeneous network connections. For example, a first user device 101 can be operatively coupled to the communication network 105 by a WWAN network connection, another user device 101 can be operatively coupled to the communication network 105 by a DSL network connection, and a non-intended traffic detection platform 103 can be operatively coupled to the communication network 105 by a fiber-optic network connection. The service provider device(s) 109 can be, for example, a web server configured to provide various applications to electronic devices, such as user device 101.

The user device 101 can be any of a variety of electronic devices that can be operatively coupled to communication network 105. A user device 101 can be for example a personal computer, a tablet computer, a personal digital assistant (PDA), a cellular telephone, a smart phone, a TV, a portable/mobile Internet device and/or some other electronic communication device. The user device 101 can include a web browser configured to access a webpage or website location hosted on or accessible via the service provider device(s) 109 over communication network 105. A service provider 109 can be a server provided by an organization that provides access to the Internet. A service provider 109 can be organized in various categories such as, for example, commercial, community owned, non-profit, privately-owned, etc. The user device 101 can be configured to support, for example, Hyper-Text Markup Language (HTML) using JavaScript. The user device 101 can include a web browser such as, for example, Internet Explorer®, Firefox®, Safari®, Dolphin®, Opera® and Chrome®. An Internet page or website location can be accessed by a user of a web browser at a user device 101 by providing the web browser with a reference such as a uniform resource locator (URL), for example, of a webpage. For example, a user of a user device 101 can access a service provider device(s) 109 via a URL designated for or assigned to the service provider device(s) 109. In some instances, user device 101 can include specialized software for accessing a web server other than a browser, such as, for example, a specialized network-enabled application or program. In some instances, portions of a website location accessible via a web server can be located in a local or remote memory space/data store accessible to the web server. The portions of the website location can be stored in the memory/data store in a database, a data warehouse, a file, etc. A user device 101 can also include a display, monitor or user interface (not shown in FIG. 1), a keyboard, various communication or input/output (I/O) ports (e.g., a USB port), and other user interface features, such as, for example, digital pens, mice, touch screen controls, audio components, and/or video components (each not shown). A user device 101 can be operatively coupled to communication network 105 via a user interface and a network connection 111.

Figure 2:
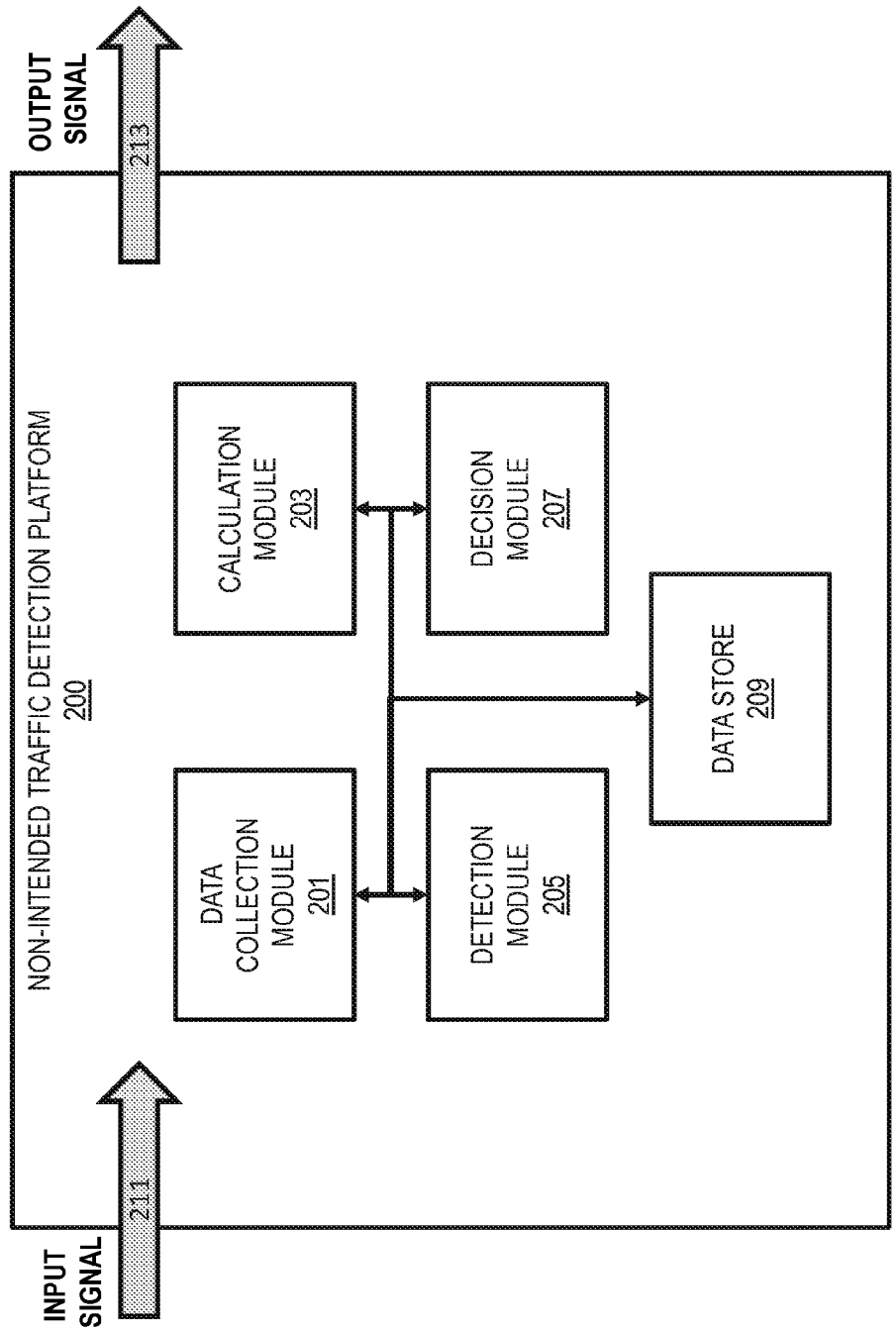
FIG. 2 is a schematic illustration of a non-intended traffic detection platform, according to an embodiment.

FIG. 2 is a schematic illustration of a non-intended traffic detection platform, according to an embodiment. Non-intended traffic detection platform 200 can be similar to the non-intended traffic detection platform 103 of FIG. 1. As shown in FIG. 2, a non-intended traffic detection platform 200 can include a data collection module 201, a calculation module 203, a detection module 205, a decision module 207 and a data store 209. In various instances, the non-intended traffic detection platform 200 and its components can be located anywhere within a communication network system 100 such as that shown in FIG. 1 including, but not limited to, within the service provider device(s) 109, or in separate network locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The non-intended traffic detection platform 200 can provide non-intended traffic detection for service provider device(s) 109. In some embodiments, the non-intended traffic detection platform 200 can receive a request from a service provider device 109 of FIG. 1 via an input signal 211, for identifying network locations (e.g., website locations) with undesirably large (e.g., higher than a pre-defined threshold) amount of non-intended users and for information related to the identified network locations. The data collection module 201 can collect data associated with network locations, the traffic on those network locations including number of visitors, identity of visitors, etc. The data collection module 201 can store the collected data in data store 209.

The data store 209 can include various repositories of network locations with non-intended traffic, co-visitation data, non-intended users' data, etc. (each not shown), as well as any data used and/or stored by the modules of the non-intended traffic detection platform 200. Furthermore, the non-intended traffic detection platform 200 can communicate with other components of a computer network system (e.g., computer network system 100 of FIG. 1) via input signals 211 and output signals 213.

In some embodiments, the calculation module 203 can identify non-intended network traffic (e.g., non-intended users) by identifying the website locations that a specific user or group of users visit repeatedly over time. The calculation module 203 can aggregate information associated with the identified website locations across multiple users. For example, the calculation module 203 can determined which website locations a user visits over an hour, a day, a week, etc. The visitation data can then be aggregated with visitation data associated with other users to determine which website locations have a number of users in common. For example, if w website locations have a number of users in common, a greater likelihood exists that the users' visits to one or more of the w website locations are non-intended. Additionally or alternatively, if the w website locations have different contents, this can be an indication that users' visits to one or more of the w website locations can be non-intended. A user(s) visiting common website locations can be referred to as "co-visitation". For example, if a user $u_1$ is monitored by the calculation module 203 during a predetermined time period t and the user $u_1$ accesses website locations x and y during the time period t, this can constitute a co-visitation by user $u_1$ of website locations x and y. In some embodiments, the calculation module 203 calculates a co-visitation factor for each network location based on co-visitation of the network locations by various users. The calculation module 203 can store the co-visitation factors in data store 209.

In some embodiments, after information on co-visitation is collected by the data collection module 201, and after a co-visitation factor is calculated by the calculation module 203, the detection module 205 can use the co-visitation factor to identify network locations with co-visitation factors over a predefined threshold as target network locations. The predefined threshold can represent a highest co-visitation factor acceptable by a service provider(s) device 109 to consider as intended traffic. The threshold can be defined based on historical data. For example, the calculation module 203 can use the data collected by the data collection module 201, results from previous data analysis, etc., (for example from data store 209) to calculate a common threshold the co-visitation factors over which show a higher probability of resulting from non-intended traffic. The detection module 205 can store the information associated with target location in data store 209.

In some embodiments, the decision module 207 can use the information associated with co-visitation factors, target network locations, etc., for making decisions on whether to provide a service (e.g., a bidding offer provided by a real-time bidding exchange "RTB", an advertisement, etc.) to a network location on a real-time bidding exchange. The decision module 207 can flag the website locations with a relatively large or unacceptable number of non-intended users (e.g., with co-visitation factors over a predefined threshold) as suspicious website locations to identify as website locations that are not desirable for providing services by the service provider(s) 109 (e.g., for placing an advertisement). For example, the non-intended traffic detection platform 200 can provide the detected information to a service provider device(s) 109 (e.g., an RTB provider) and the RTB provider can use the information to manage sale of advertisement slots on behalf of network locations (e.g., website locations) for displaying advertisements tailored for a particular visitor or a group of visitors of those website locations using user devices 101.

In some instances, advertisers (or third parties representing the advertisers) each interested in displaying an advertisement to a particular visitor or a type of visitors can place a bid in an auction for an associated advertisement slot, where the highest bidder is generally awarded with the opportunity to place their advertisement in the advertisement slot to be displayed to the particular visitor or a type of visitors. In some instances, these real-time bidding auctions can be performed in the short time between the start of loading website data on a user device 101 and the completion of loading the website data on the user device 101. One example of a metric in which an advertiser can be interested when determining how much to bid on an advertisement slot, is the traffic information of the associated website provided by the non-intended traffic detection platform 200. Another example of a metric in which an advertiser can be interested when determining how much to bid on an advertisement slot, is previous website locations that a particular visitor has visited in the past, provided by the non-intended traffic detection platform 200. Non-intended traffic information provided by the non-intended traffic detection platform 200 can be used by the service provider device(s) 109 for determining a price to charge an advertiser for an advertisement slot on a website.

In some embodiments, the flags set by the decision module 207 on website locations can be used, for example, for training service provider device(s) 109, for example, to be able to provide targeted services (e.g., targeted advertisements). For example, a flag can be used to exclude events (e.g., website traffic events) when training targeting model for a service provider(s) 109.

Figure 3:
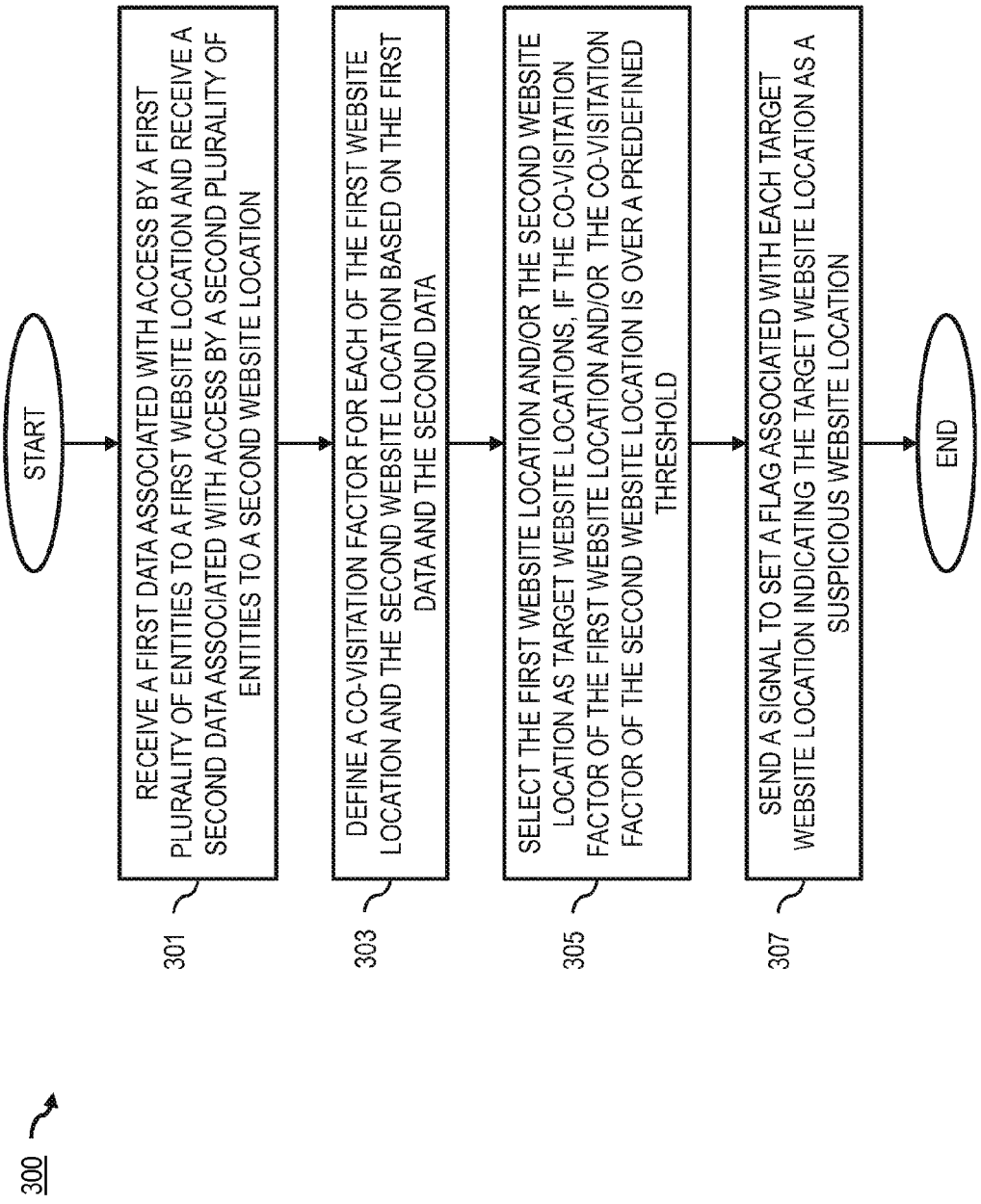
FIGS. 3-4 are flowcharts of processes for detecting non-intended traffic using co-visitation information, according to an embodiment.
Figure 4:
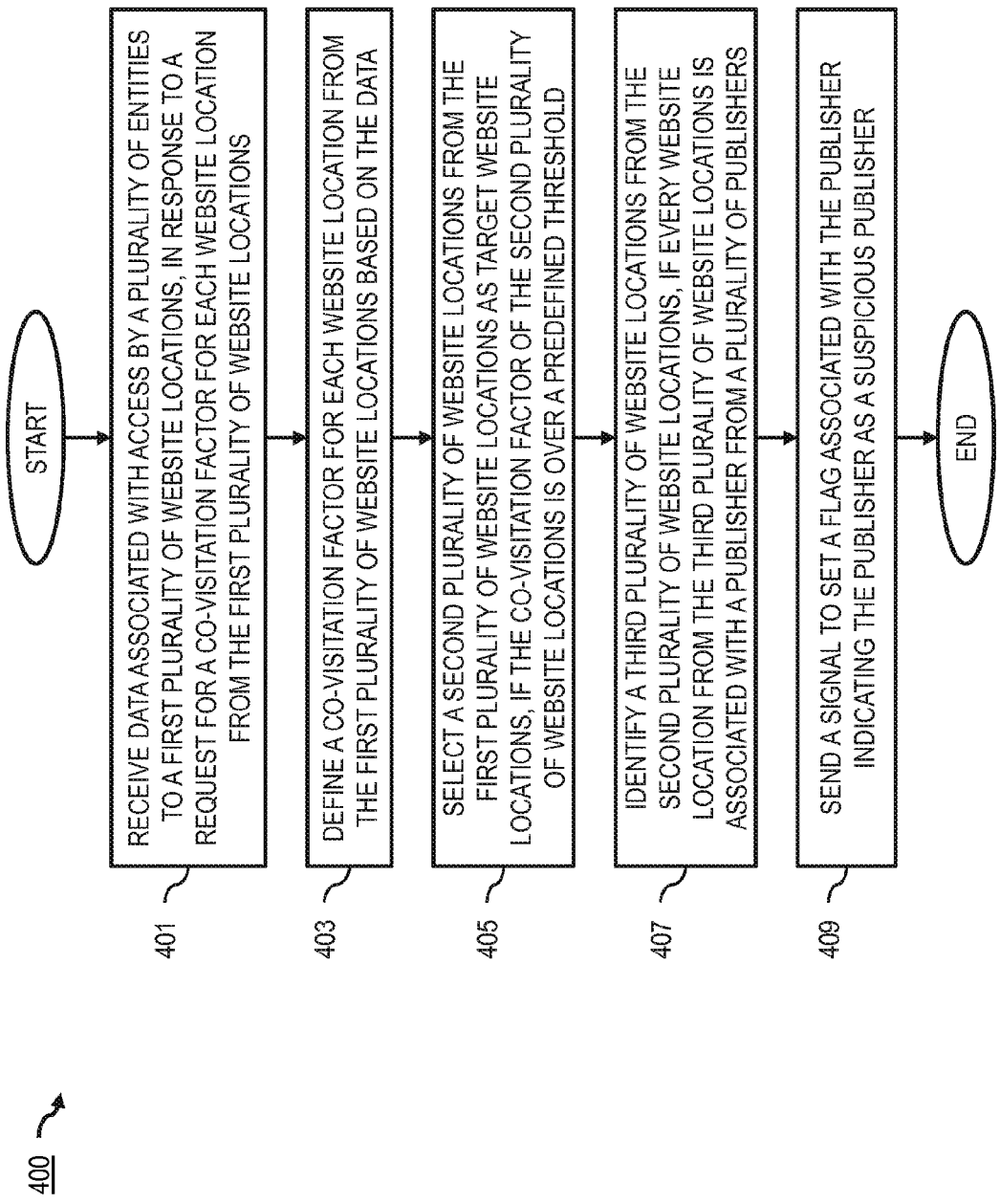

FIGS. 3-4 are flowcharts of processes for detecting non-intended traffic using co-visitation information, according to an embodiment. FIG. 3 is a flowchart for flagging website locations as suspicious, according to an embodiment. At 301, a first data associated with access by a first set $s_1$ of user devices 101 to a first website location x is received, for example, by the data collection module 201 via an input signal 211. Similarly, a second data associated with access by a second set $s_2$ of user devices 101 to a second website location y is also received. The first and the second data can be stored in a data storage such as, for example, the data store 209.

At 303, a co-visitation factor for each of the first website location x and the second website location y is defined, for example, by the calculation module 203. The co-visitation factor can be defined for every pair of a first website location and a second website location based on the first data and the second data. In other words, although FIG. 3 is described in reference to two website locations, it should be understood that the process can be repeated for a very large number of websites.

In some instances, definition of the co-visitation factor can identify website locations that share a relatively large number of the same users (e.g., user devices 101). For example, if K users, where K is greater than a threshold value m, visit both website locations x and y during a predetermined time period (for example, one hour, one day, one week, etc.), this can be an indication that website locations x and y share K users.

In some instances, the calculation module 203 can identify website locations that share a large percentage of the same users as website locations having a large number of non-intended users. For example, if 90% of visitors to website location x also visit website location y during a predetermined time period, this can be an indication that the visits to website locations x, y, or both are non-intended. The calculation can be performed, for example, by determining the number of visitors to website location x that also visit website location y and then dividing the number by the total number of visitors to website location x or the total number of visitors to website location y.

In some instances, for a pair of website locations x and y, multiple co-visitation factors can be calculated, where the total number of visitors to each website location can be used as a denominator when finding the co-visitation factor. For example, among the two website locations, x and y, if website location x has 100 and website location y has 1000 visitors during a monitored time period and 95% of the visitors to website location x also visit website location y, then if traffic for website location x, 100 is used in the denominator, the co-visitation factor is 95%. However, if the traffic for site y, 1000 is used in the denominator, then the co-visitation factor is 9.5%. In some instances, the number of visitors for the website location with the higher number of visitors can be used when calculating the co-visitation factor. Alternatively, the number of visitors for the website location with the lower number of visitors can be used when calculating the co-visitation factor. In another alternative, the co-visitation factor can be calculated using the number of visitors for both website locations in the denominator, and the co-visitation factor can be found using a weighted average of the co-visitation factors calculated using each number, where the weights can be determined based on total traffic, content, trends in traffic, presence of links, type of website locations (e.g., commercial, blog, .com, .org, .edu, search engine, etc.), and/or any other suitable factors.

In some instances, the co-visitation information can be represented graphically, where each website location (e.g., x and y) visited by a user of a user device 101 can be represented as a point (e.g., a graph node) and website locations that share a co-visitation number or percentage of shared users can be connected by a line (e.g., a graph edge) connecting the nodes. For example, if two website locations x and y, have a percentage (e.g., 85%) of the same users over a monitored period of time, then the two website locations can be plotted as nodes on the graph connected by a graph edge.

For example, a bi-partite graph, G=(U,W,E) can be defined with a set U of user nodes (user devices 101), a set W of website location nodes (e.g., x and y) visited by users from set U, and a set E of edges, where edges of set E connect user nodes U with website location nodes W. The users U are identified, for example, by the calculation module 203, visiting website locations W over a predetermined time period.

In some instances, a unimodal graph of the website locations W can be constructed from the bi-partite graph by projecting the bi-partite graph on the W nodes. Such projection can be shown as equation (1):

$$G_W^m = \left\langle V_W \subseteq W, E = \{(x,y): x,y \in W, \Gamma_G(x) \cap \Gamma_G(y) \geq m\} \right\rangle \quad (1)$$

where $V_W$, a subset of website locations W, is the set of nodes of graph G, and $\Gamma_G(x)$ is the set of neighbors of a graph node x in the original bi-partite graph. The nodes x and y represent website locations. In this example, m is a threshold value on the number of users that visit both website locations x and y.

In some instances, a threshold value n can be defined, for example by the calculation module 203, based on co-visitation factors (e.g., the percentage of users U that visit both website locations x and y). A projection of such example can be shown as equation (2):

$$G_W^m = \left\{ V_W \subseteq W, E = \left\{ (x, y): x, y \in W, \frac{[\Gamma_G(x) \cap \Gamma_G(y)]}{(\Gamma_G(x))} \geq n: n \in [0, 1] \right\} \right\} \quad (2)$$

In some instances, using the projection represented in equation (2), networks of co-visitation information can be established where each edge E represents a link between two website locations x and y, when at least n*100 percent of the users of website location x are also users of website location y.

At 305, the first website location x and/or the second website location y are selected as target website locations, for example by the detection module 205, if the co-visitation factor of the first website location x and/or the co-visitation factor of the second website location y is higher than the predefined threshold value n.

At 307, a signal is sent, for example by the decision module 207 via an output signal 213, to set a flag associated with each target website location (e.g., the first website location x and/or the second website location y) indicating the target website location as a suspicious website location. The flag can be used, for example by a service provider device 109, to determine whether to provide services such as, for example, placing advertisements to a particular website. For example, the flagged or un-flagged status of a website location x or y can be used in determining whether to place advertisements on the flagged or un-flagged website location. The signal can prevent the suspicious website location from being designated to receive advertisements. Additionally or alternatively, a flagged website location and information derived from a flagged website location can be ignored or disregarded when training display advertising targeting models. This can allow such display advertising targeting models to be trained with information associated with legitimate website locations and information associated with suspicious website locations. Accordingly, the display advertising targeting models can more accurately model user intentions and not be influenced (or be less influenced) by non-intended user activities.

In some instances the first data or the second data can include bid requests received in an online real-time bidding auction. In such instances, the flagged status of a website location can be shared with real-time bidding exchanges, or can be used in determining whether to buy an advertisement on a flagged website location based on a price of the advertisement.

In some instances, the non-intended traffic detection platform 200 can detect website locations with a particular co-visitation factor (or range of co-visitation factors) and make decisions about whether to place an advertisement on such website locations. In other instances, the non-intended traffic detection platform 200 can add website locations with a particular co-visitation factor (or range of co-visitation factors) to a black list of website locations to be blocked from being accessed by a browser running on a user device 101. The black list of suspicious website locations can be stored, for example, in the data store 209.

In some instances, the co-visitation factor can be defined based on an intersection of users (e.g., user devices 101) in the first set $s_1$ of user devices 101 and the second set $s_2$ of user devices 101, that access both of the first website location x and the second website location y based on the first data and the second data, as previously discussed with regards to step 301 of FIG. 3. A normalization of the percentage of user devices 101 accessing the first website location x and the second website location y can be defined based on a number of user devices 101 in the first set $s_1$ and a number of user devices 101 in the second set $s_2$. In some instances, the co-visitation factor for each of the first website location x and the second website location y can be defined based, at least in part, on the normalization of the percentage of user devices 101. In some instances, a user from a set $s_1$ or $s_2$ can be associated with at least one of a spyware, a botnet, or a virus.

FIG. 4 is a flowchart for flagging publishers as suspicious, according to an embodiment. A publisher (not shown in FIG. 1) can define or maintain multiple suspicious website locations to collect or be associated with (or credited with) as much user traffic as possible, seemingly legitimate user traffic. In some instances, the number of suspicious website locations associated with a particular publisher may be higher than a predefined threshold (e.g., an acceptable level). In such instances, the non-intended traffic detection platform 200 can flag that particular publisher as a suspicious publisher. The non-intended traffic detection platform 200 can then flag each website location associated with that particular publisher as suspicious website locations.

At 401, data associated with access by a first set $s_1$ of user devices 101 to a first set $w_1$ of website locations is received, for example, by the data collection module 201, in response to a request for a co-visitation factor for each website location from the first set $w_1$ of website locations. The received data can be stored in a data storage such as, for example, the data store 209.

At 403, a co-visitation factor for each website location from the first set $w_1$ of website locations is defined, for example, by the calculation module 203. The co-visitation factor can be defined based, at least in part, on the received data.

At 405, a second set $w_2$ of website locations from the first set $w_1$ of website locations is selected, for example by the detection module 205, as target website locations ($w_2 \subseteq w_1$), if the co-visitation factor of the second set $w_2$ of website locations is higher than a predefined threshold value. The target website locations of set $w_2$ can represent website locations with relatively large numbers of non-intended users.

At 407, a third set $w_3$ of website locations from the second set $w_2$ of website locations is identified, for example by the detection module 205 ($w_3 \subseteq w_2$), if every website location from the third set $w_3$ of website locations is associated with a specific publisher p from a set of publishers. A publisher can be a distributor of electronic resources such as, for example, website locations, blogs, video games, etc. The non-intended traffic detection platform 200 can use various resources such as, for example, domain registration databases to find website locations from common owners (e.g., publishers).

At 409, a signal is sent, for example, by the decision module 207 via an output signal 213, to set a flag associated with publisher p indicating the publisher p as a suspicious publisher. The decision module 207 can store information associated with suspicious publishers, website locations published by the suspicious publishers, and flags associated with suspicious publishers in data store 209 or in other locations in the communication network system 100 of FIG. 1 being accessible by the service provider device(s) 109 via the communication network 105. The flag can be used to determine whether to provide services by the service provider device(s) 109 to website locations such as, for example, placing advertisements to a particular website location published by publisher p. For example, the flagged or un-flagged status of a publisher p can be used in determining whether to place advertisements on websites associated with the flagged or un-flagged publisher p. The signal can prevent website locations associated with publisher p from being designated to receive advertisements. Additionally or alternatively, a website location and information derived from a website location associated with a flagged publisher p can be ignored when training display advertising targeting models. This can allow display advertising targeting models to be trained with information associated with legitimate website locations (from legitimate publishers) and not with information associated with suspicious website locations (from suspicious publishers). Accordingly, the display advertising targeting models can more accurately model user intentions and not be influenced (or be less influenced) by non-intended user activities.

In some instances, the received data can include bid requests received in an online real-time bidding auction. In such instances, the flagged status of a publisher p can be shared with real-time bidding exchanges, or can be used in determining whether to buy an advertisement on a website location associated with a flagged publisher p based on a price of the advertisement.

In some instances, the non-intended traffic detection platform 200 can add publishers of website locations with a relatively high co-visitation factor to a black list of publishers. A website location associated with a black-listed publisher can be considered suspicious regardless of suspicious activity by the website. The website locations associated with a publisher from the black list can be blocked from being accessed by a browser running on a user device 101. The black list of suspicious publishers can be stored in the data store 209.

In some instances, at step 407, the detection module 207 can identify multiple sets of website locations (similar to the third set $w_3$), each set being associated with a different publisher from a set of publishers. In such instances, the non-intended traffic detection platform 200 can repeat the processes of steps 407 and 409 multiple times for each set of website locations such that the different publishers associated with each set of website locations can be flagged as suspicious publishers.

Figure 5A:
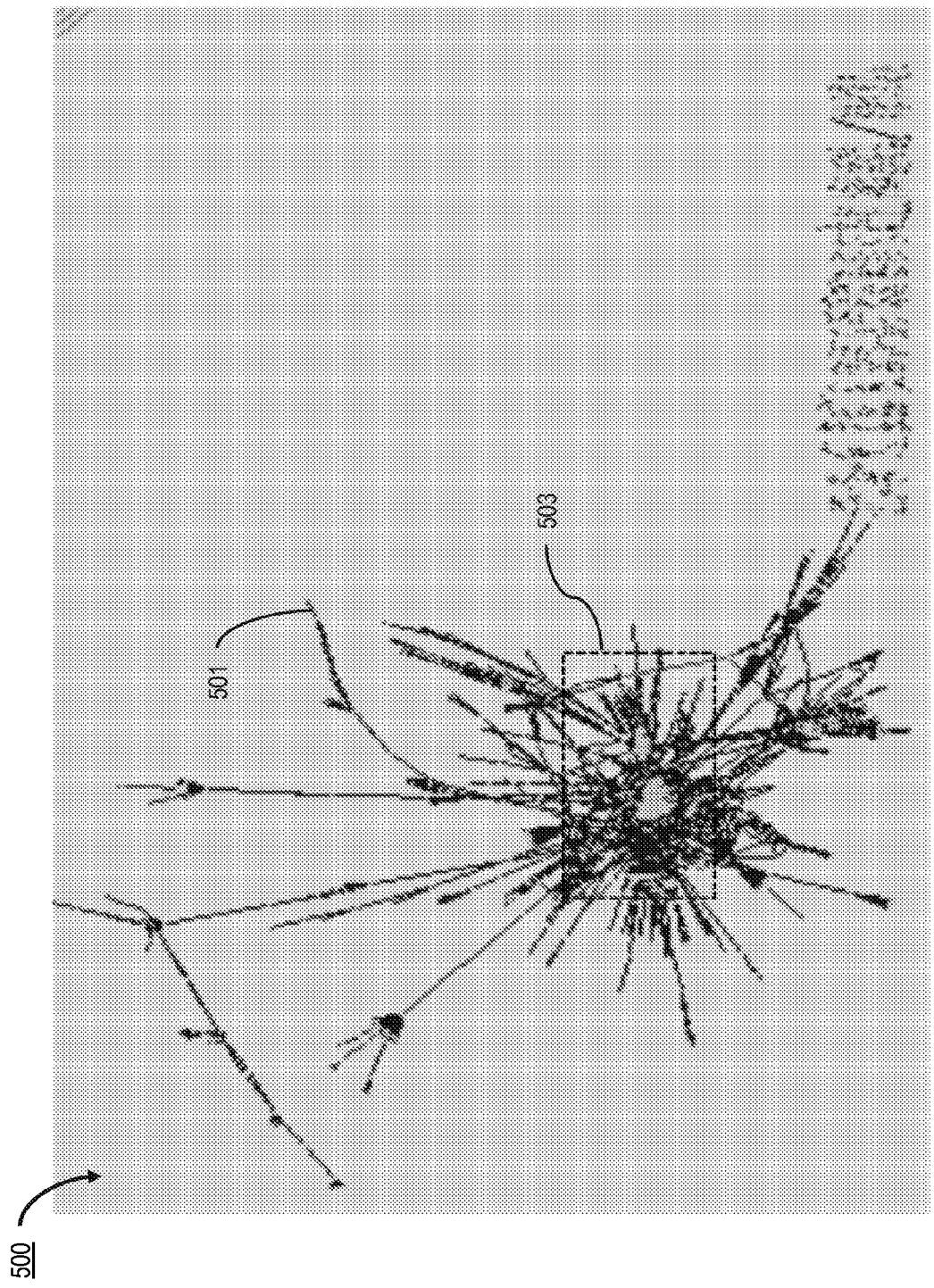
FIGS. 5A-5B are graph illustrations of a sample network of co-visitation information, according to an embodiment.
Figure 5B:
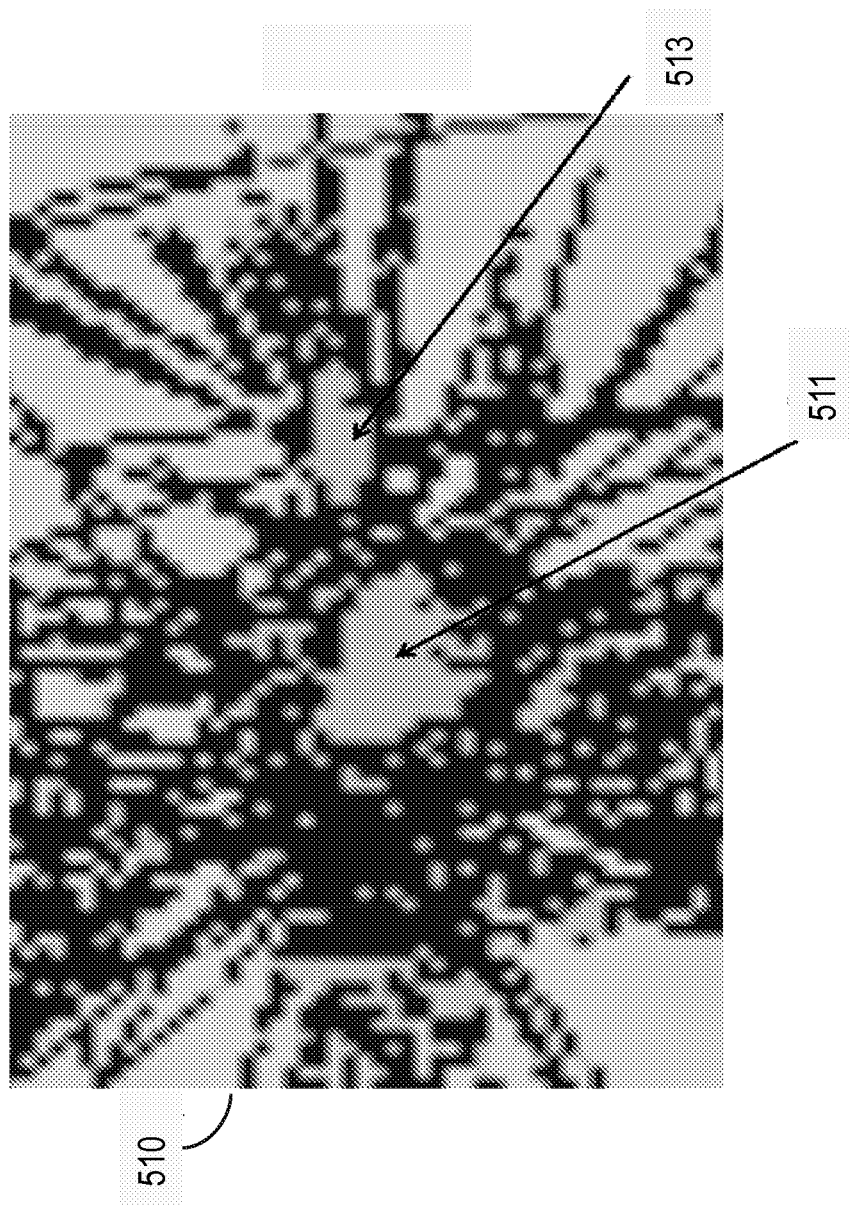

FIGS. 5A-5B are graph illustrations of a sample co-visitation network, according to an embodiment. FIG. 5A is an example of a graph 500 associated with equation (2). In FIG. 5A, each node 501 represents a website location and each line represents a link between website locations identifying co-visitation between the websites represented by the nodes. In the example of FIG. 5A, the threshold value n is set at 0.9, such that only website locations with a co-visitation factor higher than 90% are included in graph 500.

In some instances, position of nodes 501 (e.g., website locations) in graph 500 can represent the domain names of website locations, the Internet Protocol (IP) addresses of website locations, etc.

FIG. 5B is an illustrative example showing an expansion 510 of a portion of graph 500 of FIG. 5A shown as 503. The cluster of nodes identified as 511 in graph 510 of FIG. 5B is an example of a cluster about 700 website locations identified as having a co-visitation factor higher than a threshold n. For example, each of the website locations in the cluster 511 can have a co-visitation factor higher than 90% during a monitored period of time. The cluster identified as 513 is an example of a different cluster of about 200 website locations having a co-visitation factor higher than 90% during the monitored period of time. In some instances, a scale of the color of a cluster such as 511 or 513 can be defined based on the value of co-visitation factor for the cluster. For example, a darker gray scale may represent a higher co-visitation factor.

The website locations in graph 510 can range, for example, in content from cooking to video games, Las Vegas, news sites, etc. Many similar clusters with their own characteristics can be learned, for example, by the non-intended traffic detection platform 200 from focusing on certain neighborhoods in graph 500 of FIG. 5A.

In some instances, co-visitation patterns observed in graph 500 of FIG. 5A can suggest that many website locations are passing users around, sometimes at alarming rates, to, for example, monetize the users in real-time bidding exchanges. In some instances, a comparison between a co-visitation graph of a website location (e.g., an unknown website location) to co-visitation graph of known legitimate website locations can suggest that a high fraction of the traffic of the unknown website location can be non-intended. In such instances, the non-intended traffic detection platform 200 can perform the processes as described in FIG. 3 or 4 to determine whether the unknown website location is a suspicious website location It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code representing instructions configured to be executed by a processor, the code comprising code to cause the processor to:
   receive a first data associated with access by a first plurality of entities to a first website location;
   receive a second data associated with access by a second plurality of entities to a second website location;
   define a percentage of total entities in the first plurality of entities and the second plurality of entities that accessed both of the first website location and the second website location based, at least in part, on the first data and the second data;
   define a co-visitation factor for each of the first website location and the second website location based, at least in part, on the percentage of total entities;
   send a signal indicating the first website location is a suspicious website location when the co-visitation factor for the first website locations is over a predefined threshold;
   send a signal indicating the second website location is a suspicious website location when the co-visitation factor for the second website location is over the predefined threshold.

2. The non-transitory processor-readable medium of claim 1, wherein:
   the code to send the signal associated with the first website location includes code to cause the processor to send a signal to perform at least one of (1) prevent the first website location from being designated to receive advertisements, or (2) block a bid request from the first website location; and
   the code to send the signal associated with the second website location includes code to cause the processor to send a signal to perform at least one of (1) prevent the second website location from being designated to receive advertisements, or (2) block a bid request from the second website location.

3. The non-transitory processor-readable medium of claim 1, wherein the first data or the second data includes information indicative of bid requests received in an online real-time bidding auction.

4. The non-transitory processor-readable medium of claim 1, wherein the code to define the co-visitation factor includes code to:
   define a normalization of the percentage of total entities for each of the first website location and the second website location based, at least in part, on a number of entities in the first plurality of entities and a number of entities in the second plurality of entities,
   the co-visitation factor for each of the first website location and the second website location based, at least in part, on the normalization of the percentage of total entities.

5. The non-transitory processor-readable medium of claim 1, wherein:
   the first data is associated with access by the first plurality of entities to the first website location during a first time period;
   the second data is associated with access by the second plurality of entities to the second website location during a second time period at least a portion of which overlaps with the first time period; and
   the co-visitation factor for each of the first website location and the second website location is defined for access during a third time period that is within the first time period and the second time period.

6. The non-transitory processor-readable medium of claim 1, further comprising code to cause the process to:
   send a signal indicating a publisher of the first website location is a suspicious publisher when (1) the co-visitation factor for the first website location is over the predefined threshold, (2) the co-visitation factor for the second website location is over the predefined threshold, and (3) the publisher of the first website location corresponds to a publisher of the second website location.

7. The non-transitory processor-readable medium of claim 6, wherein the code to send the signal indicating the publisher includes code to cause the processor to send a signal to block a bid request from the suspicious publisher.

8. The non-transitory processor readable medium of claim 1, wherein the co-visitation factor for the first website is less than 100%.

9. A non-transitory processor-readable medium storing code representing instructions configured to be executed by a processor, the code comprising code to cause the processor to:
receive data associated with access by a plurality of entities to a first plurality of website locations;
select a second plurality of website locations from the first plurality of website locations based, at least in part, on a co-visitation factor for each website location from the second plurality of website locations being over a pre-defined threshold, the co-visitation factor for a website location from the second plurality of website locations being less than 100%, the co-visitation factor representing a proportion of the plurality of entities that accessed a website location from the plurality of website locations and a website location from the first plurality of website locations;
select a third plurality of website locations from the second plurality of website locations, each website location from the third plurality of website locations being associated with a common publisher; and
send a signal indicating the common publisher is a suspicious publisher.

10. The non-transitory processor-readable medium of claim 9, wherein:
the code to cause the processor to send the signal includes code to cause the processor to send a signal to block a bid request from the suspicious publisher.

11. The non-transitory processor-readable medium of claim 9, wherein the data includes information indicative of bid requests received in an online real-time bidding auction.

12. The non-transitory processor-readable medium of claim 9, wherein the code to cause the processor to define the co-visitation factor includes code to cause the processor to:
define, for each website location from the first plurality of website locations, a percentage of total entities in the plurality of entities that accessed that website location and at least one other website location from the first plurality of website locations; and
define a normalization of the percentage of total entities for each website location from the first plurality of website locations based, at least in part, on a number of entities in the plurality of entities,
the co-visitation factor for each website location from the first plurality of website locations based, at least in part, on the normalization of the percentage of total entities for that website location.

13. The non-transitory processor-readable medium of claim 9, wherein:
a first portion of the data is associated with access during a first time period; and
a second portion of data is associated with access during a second time period at least a portion of which overlaps with the first time period,
the co-visitation factor for each website location from the second plurality of website locations is defined for access during a third time period that is within the first time period and the second time period.

14. The non-transitory processor-readable medium of claim 9, further comprising code to cause the processor to send a signal to block a bid request from the suspicious publisher.

15. A non-transitory processor-readable medium storing code representing instructions configured to be executed by a processor, the code comprising code to cause the processor to:
receive data associated with access by a plurality of entities to a plurality of website locations;
calculate a co-visitation factor for each website location from the plurality of website locations based, at least in part, on the data, the co-visitation factor representing a number of entities in the plurality of entities that accessed that website location and at least one other website locations from the plurality of website locations; and
send, for each website location from the plurality of website locations for which the co-visitation factor exceeds a pre-defined threshold,
a signal indicating that website location is a suspicious website location.

16. The non-transitory processor-readable medium of claim 15, further comprising code to cause the processor to send, for each website location from the plurality of website locations and associated with unintended access, a signal to perform at least one of (1) prevent that website location from being designated to receive advertisements, or (2) block a bid request from that website location.

17. The non-transitory processor-readable medium of claim 15, wherein the data includes information indicative of bid requests received in an online real-time bidding auction.

18. The non-transitory processor-readable medium of claim 15, further comprising code to cause the processor to:
define, for each website location from the plurality of website locations, a percentage of total entities in the plurality of entities that accessed that website location and at least one other website location from the plurality of website locations based, at least in part, on the number of entities; and
define, for each website location from the plurality of website locations, a co-visitation factor for that website location based, at least in part, on the percentage of total entitles for that website location.

19. The non-transitory processor-readable medium of claim 18, wherein, for each website location from the plurality of website locations, the co-visitation factor for that website location is defined based, at least in part, on a bi-partite graph.

20. The non-transitory processor-readable medium of claim 15, wherein:
the data is associated with access by the plurality of entities to the plurality of website locations during a first time period,
the number of entities, for each website location from the plurality of website locations, is calculated for access during a second time period that is smaller than and within the first time period.

21. The non-transitory processor-readable medium of claim 15, further comprising code to cause the process to:
send, for each suspicious website location, a signal indicating a publisher of that suspicious website location is a suspicious publisher when the publisher of that suspicious website location corresponds to a publisher of at least one other suspicious website location.

22. The non-transitory processor readable medium of claim 15, wherein a co-visitation factor for a website location from the plurality of website locations is less than 100% and exceeds the pre-defined threshold.

* * * * *